United States Patent [19]

Nakaya et al.

[11] Patent Number: 4,581,395

[45] Date of Patent: Apr. 8, 1986

[54] AQUEOUS COATING COMPOSITION, AND ITS PRODUCTION

[75] Inventors: Toshiharu Nakaya, Oyamazaki; Takanobu Ueda, Neyagawa; Hidefumi Okuda, Toyonaka, all of Japan

[73] Assignee: Nippon Paint Co., Ltd., Osaka, Japan

[21] Appl. No.: 628,978

[22] Filed: Jul. 12, 1984

Related U.S. Application Data

[63] Continuation of Ser. No. 412,522, Aug. 26, 1982, abandoned.

[30] Foreign Application Priority Data

Aug. 26, 1981 [JP] Japan ............................. 56-134575

[51] Int. Cl.$^4$ ............................................. C08L 33/02
[52] U.S. Cl. ............................ 523/410; 523/409; 523/412
[58] Field of Search .................... 523/409, 410, 412

[56] References Cited

U.S. PATENT DOCUMENTS

| | | | |
|---|---|---|---|
| 3,492,252 | 1/1970 | Euchner | 523/412 |
| 3,945,963 | 3/1976 | Levine | 523/412 |
| 4,021,396 | 5/1977 | Wu | 523/412 |
| 4,029,620 | 6/1977 | Chen | 523/409 |
| 4,087,397 | 5/1978 | Martorano | 524/522 |
| 4,104,230 | 8/1978 | Chang | 523/409 |
| 4,122,055 | 10/1978 | Tugukuni | 524/512 |
| 4,247,439 | 1/1981 | Matthews | 523/412 |
| 4,312,795 | 1/1982 | Taguchi | 524/522 |
| 4,377,433 | 3/1983 | Merz | 523/409 |
| 4,446,260 | 5/1984 | Woods | 523/409 |
| 4,458,040 | 7/1984 | Suzuki | 523/409 |

*Primary Examiner*—Paul R. Michl
*Attorney, Agent, or Firm*—Wenderoth, Lind & Ponack

[57] ABSTRACT

An aqueous coating composition which comprises a carboxy group-containing resin powder (I), a basic compound (II) and an aqueous resin (III), optionally with a reactive compound (IV) to at least one of the resin powder (I) and the aqueous resin (III), in an aqueous medium, the basic compound (II) being contained in an amount of 0.4 to 1.2 equivalents to the carboxy group in the resin powder (I) so as to disperse the resin powder (I) into the aqueous medium and the weight proportion of the resin powder (I) and the aqueous resin (III) being from 2:98 to 98:2. The coating composition thus obtained is excellent in storage stability and workability and can provide a coating film having good performances.

14 Claims, No Drawings

AQUEOUS COATING COMPOSITION, AND ITS PRODUCTION

This application is a continuation, of now abandoned application Ser. No. 412,522, filed Aug. 26, 1982, now abandoned.

The present invention relates to an aqueous coating composition, and its production. More particularly, it relates to an aqueous coating composition comprising an aqueous resin and a resin powder, which is excellent in storage stability and application property and can provide a coating film having favorable physical properties such as high water resistance and high blister resistance, and its production.

Coating compositions comprising an organic solvent medium have various problems such as unfavorable influences on human bodies, high possibility of explosion and firing, etc. Because of this reason, a demand for coating compositions comprising an aqueous medium is nowadays much increased. Aqueous coating compositions are, in most cases, prepared by solubilizing resins with basic substances to dissolve them into aqueous media. In order to realize such solubilization, hydrophilic functional groups are introduced into the resins. However, those hydrophilic functional groups tend to remain as such in the coating films formed from the resins having them. As a result, the coating films show only inferior film chemical and physical properties. This tendency is particularly remarkable when the hydrophilic functional group is a carboxy group.

Recently, there have been developed powder dispersing aqueous coating compositions, which are obtainable by dispersing resin powders into aqueous media containing aqueous resins. Such coating compositions are well balanced in the flowing property of aqueous resin coating compositions and the thick film forming property of resin powder coating compositions and can overcome the unfavorable sagging property inherent to the aqueous resin coating compositions while maintaining such favorable property of powder resin coating compositions as hardly producing pinholes. However, dispersing of powder resins into aqueous media containing or not containing aqueous resins requires a relatively long time. Further, the resulting coating compositions are quite sensitive to the variation of temperature and inferior in storage stability.

As a result of the extensive study to overcome the above problems as observed in conventional aqueous coating compositions comprising resin powders, it has been found that neutralization of the powder of a carboxy group-containing resin such as a polyester resin or an acrylic resin with a basic compound in an aqueous medium to a certain extent can achieve easily the dispersing of the said resin powder, and the resulting dispersion is quite stable on storage and does not produce any deterioration such as viscosity increase and gellation even at a high temperature.

According to the present invention, there is provided an aqueous coating composition which comprises a carboxy group-containing resin powder (I), a basic compound (II) and an aqueous resin optionally containing a carboxy group (III), optionally with a reactive compound (IV) to at least one of the resin powder (I) and the aqueous resin (III), in an aqueous medium, the basic compound (II) being contained in an amount of 0.4 to 1.2 equivalents to the carboxy group(s) in the resin powder (I) so as to disperse the resin powder (I) into the aqueous medium and the weight proportion of the resin powder (I) and the aqueous resin (III) in terms of the solid component being from 2:98 to 98:2.

The carboxy group-containing resin powder (I) is intended to mean any solid resin having a carboxy group in a powdery form, which is by itself hardly dispersible into water but becomes dispersible in the presence of the basic compound (II). Typical examples of such solid resin are a polyester resin, an acrylic resin, etc. Its particle size affords an influence on the storage stability, the application property, the appearance of the coating film, etc. and may be usually from 3 to 60 microns, preferably from 5 to 25 microns. The acid value of the resin powder (I) with respect to the carboxy group is usually from 15 to 300, preferably from 30 to 100. When the acid value is too small, the dispersibility of the particles is lowered and the particle size becomes large so that the stability of the coating composition and the finishing and appearance of the coating film are deteriorated. When too large, the carboxy group in the resin powder (I) remains free even after curing, and the coating film formed thereby is inferior in water resistance.

As the basic compound (II) which is to be itself soluble in water, there may be employed any organic or inorganic substance which can neutralize the carboxy group in the resin powder (I) to disperse the resin powder into an aqueous medium. Examples of the basic compound (II) are lithium hydroxide, potassium hydroxide, sodium hydroxide, ammonia, monomethylamine, dimethylamine, trimethylamine, monoethylamine, diethylamine, triethylamine, monoisopropylamine, diisopropylamine, diethylene triamine, triethylene tetramine, monoethanolamine, diethanolamine, triethanolamine, monoisopropanolamine, diisopropanolamine, dimethylethanolamine, diethylethanolamine, 2-amino-2-methylpropanol, 2-dimethylamino-2-methylpropanol, morpholine, N-methylmorpholine, N-ethylmorpholine, piperazine, etc. Among them, preferred are organic basic compounds having a boiling point of 40 to 180° C. Further, the presence of a hydroxyl group in the basic compound (II) is favorable for solubilizing the resin powder (I) and the aqueous resin (III) into an aqueous medium easily. When the boiling point is too low, it may be vaporized on the neutralization of the carboxy group in the resin powder (I) so that the neutralization purpose can not be attained. When the boiling point is too high, it remains as such in the coating film so that the curing is delayed and a coating film having good performances is hardly obtainable. Further, the temperature for baking is obliged to make higher for vaporization of the basic compound (II).

The basic compound (II) may be used in an amount of 0.4 to 1.2 equivalents, preferably of 0.6 to 1.0 equivalent, to the carboxy group(s) in the resin powder (I). By the use of the basic compound (II) in such amount, an excellent dispersibility of the resin powder (I) into an aqueous medium can be assured, and a coating composition having a good storage stability is obtained. When the amount of the basic compound (II) is too small, the neutralization of the carboxy group in the resin powder (I) is insufficient, and the particle size of the resin powder does not become fine and phase separation is readily produced. When too large, the resin powder (I) is unfavorably solibilized into an aqueous medium to an excessive extent so that the significance of using the resin powder (I) is lost.

As the aqueous resin (III), there may be used any resin which is soluble or dispersible in an aqueous medium containing or not containing a basic substance. Their examples are alkyd resins, polyester resins, maleinated oil resins, maleinated polyalkadiene resins, epoxy resins, acrylic resins, urethane resins, etc. Usually, the solubilization (i.e. dissolving or dispersing) of these resins is achieved by introduction of a hydrophilic group therein, particularly by neutralization of thus introduced hydrophilic group with a basic compound. The introduction of a functional group may be realized by conventional procedures and also by the use of appropriate monomers and/or the suitable control of polymerization. The most popular hydrophilic group to be introduced is a carboxy group. In case of alkyd resins and polyester resins, a carboxy group may be introduced therein at the stage of the reaction between a polybasic acid and a polyvalent alcohol to make an aqueous resin. In case of maleinated oil resins, a drying oil (e.g. linseed oil, castor oil, soybean oil, tung oil) may be reacted with maleic anhydride so as to give an aqueous resin having a carboxy group. In case of maleinated polyalkadiene resins, polybutadiene (e.g. 1,2-polybutadine, 1,4-polybutadiene), polyisoprene or polycyclopentadiene may be reacted with an unsaturated carboxylic acid or its anhydride (e.g. maleic anhydride, hymic anhydride, fumaric acid, itaconic acid) to give an aqueous resin having a carboxy group. In case of epoxy resins, the reaction product between bisphenol A and epichlorhydrin is a typical example, and it may be per se water-dispersible or made water-dispersible by introduction of an acidic group into the oxirane group. In case of acrylic resins, there may be chosen any polymer, which can be made water-dispersible by treatment with a basic compound, from the reaction products of $\alpha,\beta$-unsaturated carboxylic acids or their anhydrides (e.g. acrylic acid, methacrylic acid, cinnamic acid, crotonic acid, fumaric acid, citraconic acid, maleic anhydride) with acrylic esters (e.g. methyl acrylate, ethyl acrylate, propyl acrylate, butyl acrylate, hexyl acrylate, lauryl acrylate) and/or methacrylic esters (e.g. methyl methacrylate, ethyl methacrylate, propyl methacrylate, butyl methacrylate, hexyl methacrylate, lauryl methacrylate) and optionally with other polymerizable monomers. In case of urethane resins, a water-soluble resin of base neutralization type having units of a diisocyanate compound (e.g. hexamethylene diisocyanate, tolylene diisocyanate, 4,4'-diphenylmethane diisocyanate, xylylene diisocyanate, 4,4'-methylenebis(cyclohexylisocyanate), isophorone diisocyanate) as the fundamental structure is usable. Thus, those may be prepared, for instance, by reacting said diisocyanate compound with a polyester, alkyd or acrylic compound or resin having a carboxy group and any other functional group (e.g. hydroxyl).

Among the above aqueous resins, those having a carboxy group may be solubilized into water by neutralizing the carboxy group with the basic compound (II) (e.g. monomethylamine, dimethylamine, trimethylamine, monoethylamine, diethylamine, triethylamine, monoisopropylamine, diisopropylamine, diethylenetriamine, triethylenetetramine, monoethanolamine, diethanolamine, triethanolamine, monoisopropanolamine, diisopropanolamine, dimethylethanolamine, morpholine, methylmorpholine, piperazine, ammonia, sodium hydroxide, potassium hydroxide, lithium hydroxide). These basic substances have preferably a boiling point of not higher than 180° C.

In order to assure the better dispersion stability and application property of the coating composition and the favorable chemical and physical properties of the coating film, the aqueous resin (III) is practically desirable to have an acid value of 20 to 200, a number average molecular weight of 500 to 30,000 (preferably 700 to 5,000), a water tolerance of not less than 4 times and a surface tension of not more than 51 dyne/cm (determined on 1% by weight solution).

Still, the aqueous resin (III) may have, in addition to the hydrophilic functional group such as carboxy, any other functional group which is available for crosslinking by condensation, addition, cyclization, etc. Examples of such other functional group are sulfonate groups, phosphate groups, hydroxyl groups, active methylol groups, amino groups, reactive carbon-carbon unsaturated bonds, blocked isocyanate groups, halo groups, etc. The introduction of these functional groups may be achieved by conventional procedures as in the case of the introduction of carboxy groups.

In the coating composition of the invention, the weight proportion of the resin powder (I) and the aqueous resin (III) is usually from 2:98 to 98:2, preferably from 2:98 to 60:40, in terms of solid component. When the amount of the resin powder (I) is smaller than the said lower limit, the application property is inferior. When higher than the said upper limit, the flowing property of the resulting coating composition is deteriorated. Favorably, the content of the aqueous resin (III) based on the combined amount of the resin powder (I) and the aqueous resin (III) is 40% by weight or more so that the application property of the coating composition and the appearance and gloss of the coating film become better.

In a preferred aspect, the coating composition may comprise additionally the reactive compound (IV) to at least one of the resin powder (I) and the aqueous resin (III). Examples of the reactive compound (IV) are epoxy resins, blocked isocyanate resins, melamine resins, polyvalent metal salts (e.g. cobalt naphthenate, lead naphthenate, zinc naphthenate), triglycidyl isocyanurate, dicyandiamide, etc., among which favored are epoxy resins and melamine resins. The reactive compound (IV) may be used in an amount of not more than 80% by weight based on the combined amount of the resin powder (I) and the aqueous resin (III). The use of the reactive compound (IV) results in the proceeding of crosslinking reaction so that a coating film having high performance can be obtained.

While the coating composition comprises as the medium water, preferably deionized water, it may additionally comprise a small amount of an organic solvent(s). Examples of such organic solvent are ethylene glycol monomethyl ether, ethylene glycol monoethyl ether, ethylene glycol monobutyl ether, methanol, ethanol, isopropanol, n-butanol, sec-butanol, t-butanol, dimethylformamide, etc.

Also, the coating composition may comprise any additive(s) such as a pigment, a modifier, a dispersant or a levelling agent, when desired. These additive(s) are usually incorporated into at least one of the resin powder (I) and the aqueous resin (III). The kind of the additives to be incorporated may be decided on the intended purpose.

For instance, the incorporation of a basic pigment (V) is effective for masking and inactivating the carboxy group in the resin powder (I) so as to enhance the stability of the resulting coating composition. The basic pigment (V) may be one showing a pH of more than 7 when it is admixed with pure water in a weight proportion of 5:100 (JIS K5101-24). Specific examples are zinc oxide (pH, 8.0-9.0), white lead (pH, 7.5-9.0), red lead (pH, 8.0-8.5), precipitated barium sulfate (pH, 7.5-10.0), fine calcium carbonate (pH, 8.0-11.3), aluminum silicate (pH, 8.5-10.0), strontium chromate (pH, 8.0-8.5), hydrous magnesium silicate (pH, 8.5-9.5), etc. Such basic pigment may be used in an amount of 3 to 300 parts by weight, preferably of 30 to 200 parts by weight, to 100 parts by weight of the resin powder (I).

Further, for instance, the incorporation of an antichipping pigment (VI) such as an inorganic pigment (e.g. talc, mica, carbon black, barium sulfate, sericite) of foil or scale having an average particle size of not more than 20 microns, preferably of not more than 2 microns, is effective in imparting chipping resistance to the coating film formed from the resulting coating composition. In this case, the amount of the antichipping pigment (VI) may be from 2 to 50 parts by weight, preferably from 20 to 45 parts by weight, to 100 parts by weight of the combination of the resin powder (I) and the aqueous resin (III). When an anticorrosive property is required, the incorporation of an anticorrosive pigment (VII) in addition to the said antichipping pigment (VI) is favorable. Examples of such anticorrosive pigment (VII) are metal chromates, metal phosphates, metal molybdates, metal tungstates, tannic acid, etc. The metal component in the above salts may be the one chosen from the metals belonging to Groups I to IV of the periodic table (e.g. lithium, potassium, sodium, calcium, strontium, barium, zinc, lead, aluminum). Specific examples of the metal salts are potassium chromate, strontium chromate, barium chromate, zinc chromate, lead chromate, calcium phosphate, zinc phosphate, aluminum phosphate, calcium molybdate, zinc molybdate, aluminum molybdate, potassium tungstate, barium tungstate, etc. The amount of the anticorrosive pigment may be from 2 to 50 parts by weight to 100 parts by weight of the combined amount of the resin powder (I) and the aqueous resin (III).

For preparation of the coating composition, the above essential and optional components may be combined in an optional order and mixed well by a conventional procedure, preferably while heating. For instance, the resin powder (I) is dispersed into an aqueous medium by the aid of the basic compound (II), and the resulting dispersion is admixed with an aqueous solution of the aqueous resin (III) optionally containing the basic compound (II). Further, for instance, an aqueous solution of the aqueous resin (III) containing the basic compound (II) is first prepared, and the resin powder (I) and optionally the basic compound (II) are added thereto, followed by stirring while heating. Furthermore, for instance, the resin powder (I), the basic compound (II) and the aqueous resin (III) are introduced into an aqueous medium, and the resultant mixture is then stirred while heating.

In the above preparation, mixing is desired to be effected while heating at a temperature of 35 to 95° C. Further, the neutralization rate of the resulting coating composition is favored to be from 30 to 120%, particularly from 50 to 100%. For the resin powder (I), the neutralization rate may be from 40 to 120%, preferably from 60 to 100%. When the temperature is too low, the particle size of the resin powder (I) can not be made fine, and phase separation is produced after the dispersion. When too high, the resin powder (I) is unfavorably melted to cohere. In case of the neutralization rate being too low, the particle size of the resin powder (I) can not be made fine, and phase separation is produced. In case of too high, the resin powder (I) is solubilized into an aqueous medium so that the significance of using the resin powder (I) is lost. In addition, the remarkable foaming is produced on formation of the coating film.

Incorporation of any pigment into the coating composition may be accomplished by addition of a pigment paste prepared by mixing of at least a portion of the aqueous resin (III) with the pigment in an aqueous medium to a mixture of the other components. However, any other procedure may be also adopted. For instance, in case of a basic pigment (V), it is preferred first to be melt mixed with the resin powder (I) and optionally the reactive compound (IV) to make a melt mixture powder and then admixing the melt mixture powder with the aqueous resin (III) and optionally any other component in the presence of the basic compound (II) in an aqueous medium.

Incorporation of the reactive compound (IV) may be carried out by any mixing procedure and is preferably achieved by admixing the resin powder (I) with the reactive compound (IV) in a melt state and adding the thus prepared mixture in a powder form to the other components. This procedure is particularly favorable to provide a coating composition which can afford a coating film excellent in physical properties, particularly water resistance. Specifically, in case of the reactive compound (IV) being a liquid material such as liquid melamine resins, it may be incorporated into the aqueous resin (III). In case of the reacitve compound (IV) being a solid material such as epoxy resins and blocked isocyanate resins, it may be melt mixed with the resin powder (I).

Thus, in one of preferred aspects of the invention, the resin powder (I) and the reactive compound (IV) may be formed in a powdery melt mixture comprising a carboxy group-containing resin as an example of the former and an epoxy resin as an example of the latter. The carboxy group-containing resin may be chosen from polyester resins, acrylic resins, etc. and is a solid at room temperature (preferably has a melting point of not less than 40° C.), which has usually an acid value of 20 to 300. The epoxy resin may be one having two or more epoxy groups, which is a solid at room temperature (preferably has a melting point of not less than 40° C.). Specific examples are bisphenol type epoxy resins (e.g. "Epicoat 1001", "Epicoat 1004", "Epicoat 1007" (manufactured by Shell Chem. Corp.), "Araldite 6071", "Araldite 6084"(manufactured by Ciba Geigy), "DER 660", "DER 661", "DDR 664" (manufactured by Dow Chemical Corp.), "Epiclon 1050", "Epiclon 4050" (manufactured by Dainippon Ink and Chemicals, Inc.)), phenol novolak type epoxy resins (e.g. "DEN 438" (manufactured by Dow Chemical Corp.)), etc. Conventional derivatives from these epoxy resins such as polyol type epoxy resins, alicyclic epoxy resins, halogen-containing epoxy resins, polyglycol type epoxy resins, ester type epoxy resins, and linear aliphatic epoxy resins are also usable. Those chosen from the above carboxy group-containing resins and from the above epoxy resins are mixed together, heated to melt while kneading and cooled to solidify, followed by pulverization to give their melt mixture in a powdery form. Their average particle size is preferred from 0.5 to 100 microns, particularly from 1 to 70 microns. When the particle size is too small, the storage stability may be somewhat lowered. The weight proportion of the carboxy group-containing resin and the epoxy resin is desired to be 10:1–20. In case of the proportion of the epoxy resin being too small, the water resistance and blister resistance of the coating film formed by its use may be insufficient. In case of the proportion of the epoxy resin being too large, the melt mixture can be hardly dispersed into the other components, and the resulting coating composition does not show a good dispersibility. Still, the melt mixture may comprise additionally any other resin such as a benzoin resin, a coumarone resin or an indene resin for the purpose of enhancing the smoothness of the coating film and for the purpose of increasing the crosslinkability of the coating composition. When the melt mixture as above is employed, the molar ratio of the epoxy groups and the carboxy groups in the entire system of the coating composition is preferred to be 10–150:100, particularly 20–120:100. When the amount of the epoxy groups is too small, the water resistance and blister resistance of the coating film are insufficient. When too large, the storage stability of the resulting coating composition is lowered.

Mixing of the above melt mixture comprising the carboxy group-containing resin as the resin powder (I) and the epoxy resin as the reactive compound (IV) with the aqueous resin (III) and optionally any other compound in the presence of the basic compound (II) in an aqueous medium can give the coating composition.

In the thus prepared coating composition, particles of the resin powder (I) or its melt mixture with any other component such as the reactive compound (IV) or the basic pigment (V) is dispersed evenly and stably in an aqueous medium containing the aqueous resin (III) and the basic compound (II). Such dispersing particles have usually an average particle size of 3 to 20 microns, preferably of 5 to 15 microns. When the particle size is larger, the resulting coating composition tends to produce deposits and the coating film formed thereby is poor in gloss. When smaller, the favorable property inherent to a resin powder coating composition is lost.

The thus prepared coating composition may be applied onto a substrate by a per se conventional procedure such as air spraying, airless spraying, electrostatic coating, roll coating, brush coating or dip coating.

As stated above, the coating composition of the invention has good storage stability and application property and can afford a coating film having favorable chemical and physical properties including high water resistance and blister resistance. Further, the coating film is of good adhesion. Therefore, the coating composition can be used for formation of a primer surface or an anticorrosive primer coat, etc. on the surfaces of vehicles such as automobiles. When used for formation of a top coat film, the resulting coating film shows excellent finishing appearance and sharpness.

Practical and presently preferred embodiments of the invention are illustratively shown in the following Examples wherein part(s) and % are by weight, unless otherwise indicated.

Part A

EXAMPLE 1

(A) Prepartion of the pigment paste (1):

To the aqueous resin solution No. 2 as shown in Table 1 (26.4 parts), deionized water (15.6 parts) was added to make a solid content of 31.3%. The resulting mixture was pre-mixed with titanium oxide of rutile type (60.0 parts) and further mixed in the presence of glass beads in a paint conditioner at room temperature for 40 minutes to give a white paste of not more than 10 microns in particle size. This paste had a pH of 7.3/25° C., a Stormer's viscosity of 90 ku/25° C. and a non-volatile content of 72.0%.

TABLE 1

| Aqueous resin solution No. | Kind | Acid value | Hydroxyl value | Neutralization rate (%) | Non-volatile content (%) | Molecular weight | pH |
|---|---|---|---|---|---|---|---|
| 1 | Water-soluble acrylic resin | 70 | 69 | 100 | 35 | 7000 | 8.5 |
| 2 | Water-soluble polyester resin | 55 | 35 | 80 | 50 | 1360 | 6.4 |
| 3 | Maleinated polybutadiene | 95 | — | 80 | 30 | 1200 | 7.5 |
| — | Hexamethoxymethylolmelamine | — | — | — | 98 | — | — |

(B) Preparation of the coating composition (1):

To a mixture of diethylethanolamine (boiling point, 135° C.) (0.8 g) and deionized water (37.1 g), a melt mixture of the resin powder No. 1 (12.1 g) and the resin powder No. 5 (10.5 g) as shown in Table 2 was portionwise added while stirring and heating. The resultant mixture was kept at 70° C. for 15 minutes to neutralize and disperse the resin powder, whereby a turbid dispersion of good stability (neutralization rate, 80%).

To the thus obtained dispersion, the paste (1) (102 g) as obtained in (A) was added while stirring, and the aqueous resin solution No. 2 (35.4 g) and hexamethoxymethylolmelamine (13.2 g) were further added thereto while stirring to obtain the coating composition (1). The coating composition had a non-volatile content of 60%, a Stormer's viscosity of 105 ku/25° C., a pH of 6.9 and a weight ratio of the resin powder and the aqueous resin of 34:66 in terms of solid component.

TABLE 2

| Resin powder No. | Kind | Acid value | Particle size (μ) | Melting or Softening Point (°C.) | Molecular weight | Epoxy equivalent |
|---|---|---|---|---|---|---|
| 1 | "Finedick M6107" (polyester resin manufactured by Dainippon Ink) | 53 | 104> | 109 | 3800 | — |
| 2 | "Finedick M6104" | 216 | 104> | 107 | 1800 | — |

TABLE 2-continued

| Resin powder No. | Kind | Acid value | Particle size (μ) | Melting or Softening Point (°C.) | Molecular weight | Epoxy equivalent |
|---|---|---|---|---|---|---|
| | (polyester resin manufactured by Dainippon Ink) | | | | | |
| 3 | "Finedick M6103" (polyester resin manufactured by Dainippon Ink) | 76 | 104> | 108 | 3000 | — |
| 4 | Acrylic resin | 77 | 104> | 110 | 4200 | — |
| 5 | "Epicoat 1004" (epoxy resin manufactured by Shell) | — | 104> | 100 | 1400 | 925 |

EXAMPLES 2 TO 9 AND COMPARATIVE EXAMPLES 1 TO 3

Using the aqueous resin solution as shown in Table 1, the pastes (2) and (3) as shown in Table 3 were prepared in the same manner as in Example 1 (A).

TABLE 3

| | Paste (2) | Paste (3) |
|---|---|---|
| Aqueous resin solution No. | 1 | 3 |
| Amount of aqueous resin solution | 40 parts | 45 parts |
| Amount of titanium oxide | 60 parts | 55 parts |
| pH | 8.6 | 7.7 |

TABLE 3-continued

| | Paste (2) | Paste (3) |
|---|---|---|
| Viscosity | 90 ku/25° C. | 95 ku/25° C. |
| Non-volatile content | 75% | 68.5% |

Using the paste (1), (2) or (3) and the resin powder as shown in Table 2, there were prepared coating compositions as shown in Table 4 in the same manner as in Example 1 (B). Still, the temperature and time for dispersing the resin powder in Comparative Example 3 were respectively 40° C. and 15 minutes. The properties of the coating compositions thus obtained are shown in Table 4.

TABLE 4

| | Example | | | | | |
|---|---|---|---|---|---|---|
| | 2 | 3 | 4 | 5 | 6 | 7 |
| Paste No. | 1 | 1 | 1 | 1 | 2 | 3 |
| Amount (g) | 102 | 102 | 102 | 102 | 100 | 109 |
| Resin powder No. | 1  5 | 1  5 | 1  5 | 2 | 1  5 | 1  5 |
| Amount (g) | 10.7  9.3 | 5.3  4.7 | 0.7  9.3 | 22.6 | 12.1  10.5 | 12.1  10.5 |
| Deionized water (g) | 37.5 | 19.0 | 37.5 | 31.7 | 37.1 | 37.1 |
| Basic compound (II) | TEA*(1) | DMEA*(2) | DMEA | DMEA | DMEA | DMEA |
| Amount (g) | 0.8 | 0.4 | 0.9 | 6.2 | 0.8 | 0.8 |
| Neutralization rate of resin powder (%) | 80 | 80 | 100 | 80 | 80 | 80 |
| Aqueous resin solution No. | 2 | 2 | 2 | 2 | 1 | 3 |
| Amount (g) | 85.6 | 53.6 | 15.6 | 35.4 | 47.7 | 53.3 |
| Amount of hexamethoxymethylolmelamine (g) | 24 | 0 | 9.0 | 13.2 | 13.2 | 13.2 |
| Coating composition Non-volatile content (%) | 60 | 60 | 60 | 60 | 57.1 | 53.6 |
| Viscosity (ku/25° C.) | 95 | 98 | 110 | 90 | 105 | 105 |
| pH | 6.9 | 7.0 | 7.0 | 7.0 | 8.5 | 7.6 |
| Weight ratio of resin powder and aqueous resin in terms of solid component | 20/80 | 20/80 | 40/60 | 34/66 | 34/66 | 34/66 |

| | Example | | Comparative Example | | |
|---|---|---|---|---|---|
| | 8 | 9 | 1 | 2 | 3 |
| Paste No. | 1 | 1 | 1 | 1 | 1 |
| Amount (g) | 102 | 102 | 102 | 102 | 102 |
| Resin powder No. | 3  5 | 4  5 | 1  5 | 1  5 | 1  5 |
| Amount (g) | 10.0  12.6 | 10.0  12.6 | 12.1  10.5 | 12.1  10.5 | 12.1  10.5 |
| Deionized water (g) | 37.2 | 37.2 | 38.0 | 36.6 | 37.1 |
| Basic compound (II) | DMEA | DMEA | DMEA | DMEA | DMEA |
| Amount (g) | 0.7 | 0.7 | 0.3 | 1.3 | 0.8 |
| Neutralization rate of resin powder (%) | 80 | 80 | 30 | 130 | 80 |
| Aqueous resin solution No. | 2 | 2 | 2 | 2 | 2 |
| Amount (g) | 35.4 | 35.4 | 35.4 | 35.4 | 35.4 |
| Amount of hexamethoxymethylolmelamine (g) | 13.2 | 13.2 | 13.2 | 13.2 | 13.2 |
| Coating composition Non-volatile content (%) | 60 | 60 | 60 | 60 | 60 |

TABLE 4-continued

| tion | | | | | | |
|---|---|---|---|---|---|---|
| | Viscosity (ku/25° C.) | 105 | 105 | 50 | 130 | 105 |
| | pH | 6.9 | 6.9 | 6.3 | 8.4 | 7.1 |
| | Weight ratio of resin powder and aqueous resin in terms of solid component | 34/66 | 34/66 | 34/66 | 34/66 | 34/66 |

Note:
*[1] Triethylamine (boiling point, 90° C.).
*[2] Dimethylethanolamine (boiling point, 135° C.).

EXAMPLE 10

The coating compositions as prepared in Examples 1 to 9 and Comparative Examples 1 to 3 were stored at 40° C. for 10 days, and their storage stability was tested. The results are shown in Table 5. Also, those coating compositions were subjected to test for application property on coating the surface of a satinized steel plate.

The results are also shown in Table 5. The evaluations on the stability were made according to the following standard: O, normal (viscosity change being not more than 5 ku, no sedimentation; Δ, viscosity increased; X, sedimentation.

TABLE 5

| Coating composition | Storage Stability | Limit of film thickness not producing pinhole (μ) | Limit of film thickness not producing sag (μ) |
|---|---|---|---|
| Example | | | |
| 1 | O | 45 | 70 |
| 2 | O | 50 | 60 |
| 3 | O | 45 | 60 |
| 4 | O | 40 | 80 |
| 5 | O | 40 | 55 |
| 6 | O | 40 | 50 |
| 7 | O | 40 | 50 |
| 8 | O | 45 | 70 |
| 9 | O | 45 | 70 |
| Comparative | | | |
| 1 | X | — | — |
| 2 | Δ | — | — |
| 3 | X | — | — |

Part B

EXAMPLE 11

(A) Preparation of the pigment pastes:

To the aqueous resin solution No. 1 as shown in Table 6 (46 g), deionized water (30 g) and titanium oxide of rutile type (90 g) were added, and the resulting mixture was pre-mixed and further mixed in the presence of glass beads in a paint conditioner at room temperature for 40 minutes to give a white paste of not more than 10 microns in particle size. This paste (1) had a Stormer's viscosity of 100 ku/25° C. and a non-volatile content of 68%.

Using the aqueous resin solution as shown in Table 6, the pigment pastes (2) to (4) as shown in Table 7 were prepared in the same manner as above.

TABLE 6

| Aqueous resin solution No. | Kind | Acid value | Hydroxyl value | Base for neutralization | Neutralization rate (%) | Non-volatile content (%) | Molecular weight |
|---|---|---|---|---|---|---|---|
| 1 | Polyester resin | 55 | 35 | DMEA*[2] | 80 | 50 | 1360 |
| 2 | Maleinated polybutadiene | 95 | — | DMEA | 80 | 30 | 1200 |
| 3 | Polyester resin | 55 | 35 | DMEA | 50 | 50 | 1360 |
| 4 | Polyester resin | 55 | 35 | TEA*[1] | 80 | 50 | 1360 |

Note:
*[1] Triethylamine (boiling point, 90° C.).
*[2] Dimethylethanolamine (boiling point, 135° C.).

TABLE 7

| | Paste (2) | Paste (3) | Paste (4) |
|---|---|---|---|
| Aqueous resin solution No. | 4 | 2 | 3 |
| Amount of aqueous resin solution (g) | 46 | 76 | 46 |
| Amount of deionized water (g) | 30 | — | 30 |
| Amount of titanium oxide (g) | 90 | 90 | 90 |
| Stomer's viscosity (ku/25° C.) | 105 | 90 | 88 |
| Non-volatile content (%) | 68 | 68 | 68 |

(B) Preparation of the coating composition (1):

The aqueous resin solution No. 1 as shown in Table 6 (46 g) was dissolved in deionized water (30 g), and the resin powder No. 1 (34 g) as shown in Table 8 was portionwise added thereto while heating under stirring. After the addition was completed, the resultant mixture was stirred at 70° C. for 15 minutes to give a dispersion of good stability (neutralization rate (to the entire carboxy groups), 47%).

To the thus obtained dispersion, the paste (1) (166 g) as obtained in (A) was added while stirring, and crystalline hexamethoxymethylolmelamine (20 g) was added thereto while stirring to obtain the coating composition (1). The coating composition had a non-volatile content of 64%, a Stormer's viscosity of 110 ku/25° C. and a weight ratio of the resin powder and the aqueous resin of 34:66 in terms of solid component.

TABLE 8

| Resin powder No. | Kind | Acid value | Particle size (μ) | Melting or Softening Point (°C.) | Molecular weight | Epoxy equivalent |
|---|---|---|---|---|---|---|
| 1 | "Finedick M6107" (polyester resin manufactured by Dainippon Ink) | 53 | 104> | 109 | 3800 | — |
| 2 | "Finedick M6104" (polyester resin manufactured by Dainippon Ink) | 216 | 104> | 107 | 1800 | — |
| 3 | "Finedick M6103" (polyester resin manufactured by Dainippon Ink) | 76 | 104> | 108 | 3000 | — |
| 4 | "Epicoat 1004" (epoxy resin manufactured by Shell) | — | 104> | 100 | 1400 | 925 |

EXAMPLES 12 TO 21 AND COMPARATIVE EXAMPLES 4 TO 6

In the same manner as in Example 11, there were prepared coating compositions as shown in Table 9.

TABLE 9

| | Example 12 | Example 13 | Example 14 | Example 15 | Example 16 | Example 17 | Example 18 |
|---|---|---|---|---|---|---|---|
| Aqueous resin solution No. | 1 | 1 | 1 | 1 | 1 | 1 | 2 |
| Amount (g) | 46 | 46 | 46 | 46 | 46 | 46 | 76 |
| Deionized water (g) | 30 | 30 | 30 | 30 | 30 | 30 | 0 |
| Resin powder No. | 1    4 | 1    4 | 1    4 | 3    4 | 1    4 | 1    4 | 1    4 |
| Amount (g) | 24   10 | 24   10 | 15   19 | 24   10 | 12   10 | 36   15 | 24   10 |
| Additional basic compound (II) | — | DMEA*(1) | DMEA | — | — | — | — |
| Amount (g) | — | 3.4 | 1.0 | — | — | — | — |
| Temperature (°C.) × time (min) for dispersion | 70 × 15 | 70 × 15 | 70 × 15 | 70 × 15 | 60 × 15 | 60 × 15 | 60 × 15 |
| Neutralization rate to carboxy group (%) | 53 | 110 | 80 | 47 | 64 | 45 | 53 |
| Paste No. | 1 | 1 | 1 | 1 | 1 | 1 | 3 |
| Amount (g) | 166 | 166 | 166 | 166 | 166 | 166 | 166 |
| Amount of hexamethoxymethylolmelamine (g) | 20 | 20 | 20 | 20 | 20 | 20 | 20 |
| Coating composition Nonvolatile content (%) | 64 | 64 | 64 | 64 | 62 | 66 | 64 |
| Viscosity (ku/25° C.) | 108 | 110 | 105 | 105 | 100 | 110 | 110 |
| Weight ratio of resin powder and aqueous resin (as solid component) | 34/66 | 34/66 | 34/66 | 34/66 | 25/75 | 44/56 | 34/66 |

| | | Example 19 | Example 20 | Example 21 | Comparative Example 4 | Comparative Example 5 | Comparative Example 6 |
|---|---|---|---|---|---|---|---|
| | Aqueous resin solution No. | 1 | 1 | 4 | 3 | 1 | 1 |
| | Amount (g) | 46 | 46 | 46 | 46 | 46 | 46 |
| | Deionized water (g) | 30 | 30 | 30 | 30 | 30 | 30 |
| | Resin powder No. | 1    4 | 1    4 | 1    4 | 1 | 1    4 | 1    4 |
| | Amount (g) | 24   10 | 24   10 | 24   10 | 34 | 24   10 | 24   10 |
| | Additional basic compound (II) | — | — | TEA*(2) | — | DMEA | — |
| | Amount (g) | — | — | 1.1 | — | 4.6 | — |
| | Temperature (°C.) × time (min) for | 60 × 15 | 50 × 15 | 70 × 15 | 70 × 15 | R × 30*(3) | R × 30 |

TABLE 9-continued

| | | | | | | | |
|---|---|---|---|---|---|---|---|
| | dispersion | | | | | | |
| | Neutralization rate to carboxy group (%) | 53 | 53 | 80 | 29 | 130 | 53 |
| | Paste No. | 1 | 1 | 2 | 4 | 1 | 1 |
| | Amount (g) | 166 | 166 | 166 | 166 | 166 | 166 |
| | Amount of hexamethoxy-methylol-melamine (g) | 20 | 20 | 20 | 20 | 20 | 20 |
| Coating composition | Non-volatile content (%) | 64 | 64 | 64 | 64 | 64 | 64 |
| | Viscosity (ku/25° C.) | 105 | 98 | 110 | 95 | 95 | 90 |
| | Weight ratio of resin powder and aqueous resin (as solid component) | 34/66 | 34/66 | 34/66 | 34/66 | 34/66 | 34/66 |

Note:
*(1)Dimethylethanolamine (boiling point, 135° C.).
*(2)Triethylamine (boiling point, 90° C.).
*(3)Room temperature × 30 min.

EXAMPLE 22

The coating compositions as prepared in Examples 11 to 20 and Comparative Examples 4 to 6 were stored at 40° C. for 10 days, and their storage stability was tested. The results are shown in Table 10. Also, these coating compositions were subjected to test for application property on coating the surface of a satinized steel plate. The results are also shown in Table 10. The evaluations on the stability were made according to the following standard: O, normal (viscosity change being not more than 5 ku, no precipitant); Δ, viscosity increased; X, precipitants deposited.

TABLE 10

| Coating composition | Storage stability | Limit of film thickness not producing pinhole (μ) | Limit of film thickness not producing sag (μ) |
|---|---|---|---|
| Example | | | |
| 11 | O | 55 | 70 |
| 12 | O | 60 | 70 |
| 13 | O | 60 | 60 |
| 14 | O | 65 | 70 |
| 15 | O | 55 | 60 |
| 16 | O | 60 | 60 |
| 17 | O | 60 | 75 |
| 18 | O | 55 | 65 |
| 19 | O | 65 | 70 |
| 20 | O | 60 | 70 |
| Comparative | | | |
| 4 | X | — | — |
| 5 | Δ | — | — |
| 6 | X | — | — |

Part C

EXAMPLE 23

(A) Preparation of the melt mixture powder of the carboxy group-containing resin and the epoxy resin:

The epoxy resin No. 1 in a powdery form (44 parts) and the carboxyl group-containing resin No. 1 in a powdery form (56 parts) as shown in Table 11 were charged in a pre-mix tank and stirred. The resulting mixture was transferred to a kneader and melt kneaded well at 95° C. After cooling, the solidified mixture was pulverized by the aid of a crushing machine and sieved through a 150 mesh sieve to make a melt mixture powder (1) having a particle size of not more than 100 mesh.

Using the carboxy group-containing resin and the epoxy resin as shown in Table 11, the melt mixture powder as shown in Table 12 was prepared. In case of the melt mixture powders (9) and (11), the steps of pre-mixing and melt kneading were omitted.

TABLE 11

| Resin powder No. | Epoxy equi-valent | Molecular weight | Melting or soften-point (°C.) | Tg (°C.) | Remarks |
|---|---|---|---|---|---|
| Epoxy resin | | | | | |
| 1 "Epicoat 1004" (epoxy resin manu-fatcured by Shell) | 925 | 1400 | 100 | — | Bisphenol type |
| 2 "Epicoat 1007" (epoxy resin manu-factured by Shell) | 1925 | 2900 | 126 | — | Bisphenol type |
| 3 "Finedick A217" (epoxy resin manu-factured by Dainippon Ink) | 540 | 4200 | — | 70 | Acrylic type |

TABLE 11-continued

| Resin powder No. | Epoxy equivalent | Molecular weight | Melting or softening point (°C.) | Tg (°C.) | Remarks |
|---|---|---|---|---|---|
| Carboxy group-containing resin | | | | | |
| 1 "Finedick M6103" (polyester resin manufactured by Dainippon Ink) | 76 | 3000 | 108 | — | Polyester type |
| 2 "Finedick M6107" (polyester resin manufactured by Dainippon Ink) | 53 | 3800 | 109 | 67 | Polyester type |
| 3 "Almatex PD1375" (polyester resin manufactured by Mitsui Toatsu) | 77 | — | — | — | Acrylic type |

TABLE 12

| Melt mixture powder No. | Epoxy resin No. (part) | | | Carboxy group-containing resin No. (part) | | | Weight ratio of epoxy resin and carboxy group-containing resin |
|---|---|---|---|---|---|---|---|
| | 1 | 2 | 3 | 1 | 2 | 3 | |
| 2 | — | 63 | — | 37 | — | — | 17.0/10 |
| 3 | 49 | — | — | — | 51 | — | 9.6/10 |
| 4 | 57 | — | — | — | 43 | — | 13.3/10 |
| 5 | — | 38 | — | — | 62 | — | 6.1/10 |
| 6 | — | 60 | — | — | 40 | — | 15.0/10 |
| 7 | — | — | 50 | — | — | 50 | 10.0/10 |
| 8 | — | — | 64 | — | — | 36 | 17.8/10 |
| 9 | — | — | — | 100 | — | — | 0/10 |
| 10 | — | 68 | — | — | 32 | — | 21.3/10 |
| 11 | 100 | — | — | — | — | — | ∞/10 |

(B) Preparation of the coating composition:

Into a 1000 ml volume stainless steel made reactor, the aqueous resin solution No. 1 as shown in Table 13 (138 parts), the melt mixture powder (1) (99 parts) as obtained above and titanium oxide of rutile type (136 parts) were charged, and an appropriate amount of deionized water was added thereto. The resultant mixture was dispersed using a paint conditioner at room temperature for 1 hour to make a white paste.

To the paste, melamine resin ("Cymel 303" manufactured by Mitsui Toatsu; hexamethoxymethylolmelamine; nonvolatile content, 98%) (10 parts) was added, and deionized water was added thereto to make a total amount of 130 parts. The mixture was stirred by a mixer at room temperature for 20 minutes to give a white coating composition (1).

EXAMPLES 24 to 36 and Comparative Examples 7 to 11

Using the aqueous resin solutions as shown in Table 13 and the melt mixture powders as shown in Table 12, there were prepared the coating compositions as shown in Table 14 in the same manner as in Example 23.

TABLE 13

| Aqueous resin solution No. | | Water tolerance*(1) (time) | Surface tension*(2) (dyne/cm) | Acid value | Hydroxyl value | Basic compound | Neutralization rate (%) | Nonvolatile content (%) | Molecular weight | Oil length |
|---|---|---|---|---|---|---|---|---|---|---|
| 1 | Maleinated linseed oil | 10< | 46 | 62 | 61 | DMEA*(3) | 80 | 28 | 1300 | 55 |
| 2 | Alkyd resin | 10< | 42 | 55 | 36 | DMEA | 80 | 31 | 1360 | 43 |
| 3 | Polyester resin | 5 | 48 | 10 | 100 | DMEA | 100 | 46 | 1500 | — |
| 4 | Acrylic resin | 10< | 40 | 69 | 60 | DMEA | 100 | 68 | 7000 | — |

Note:
*(1)Aqueous resin solution (5 g) was charged in a 100 ml volume beaker and diluted with deionized water. Numeral indicates the times of dilution at which No. 26 American point system letter could not be read through the beaker.
*(2)Aqueous resion solution was diluted with deionized water to make a 1% by weight solution, which was used for measurement by the aid of a surface tension tester Model CB-VP manufactured by Kyowa Kagaku.
*(3)Diethylethanolamine.

TABLE 14

| | Aqueous resin solution (part) | | | | Melt mixture powder (part) | | | | | | | | | | | Molar ratio of epoxy group and carboxyl group | Melamine resin (part) | TiO₂ (part) | Deionized water (part) |
|---|---|---|---|---|---|---|---|---|---|---|---|---|---|---|---|---|---|---|---|
| | 1 | 2 | 3 | 4 | 1 | 2 | 3 | 4 | 5 | 6 | 7 | 8 | 9 | 10 | 11 | | | | |
| Example | | | | | | | | | | | | | | | | | | | |
| 24 | 75 | — | — | — | — | 113 | — | — | — | — | — | — | — | — | — | 46/100 | 5 | 128 | 100 |
| 25 | 9 | — | — | — | — | 135 | — | — | — | — | — | — | — | — | — | 63/100 | 0.5 | 125 | 230 |
| 26 | — | 177 | — | — | — | — | 41 | — | — | — | — | — | — | — | — | 30/100 | 13 | 123 | 95 |
| 27 | — | 61 | — | — | — | — | 98 | — | — | — | — | — | — | — | — | 79/100 | 5 | 119 | 195 |
| 28 | — | 155 | — | — | — | — | — | 77 | — | — | — | — | — | — | — | 61/100 | 12 | 138 | 125 |
| 29 | — | 84 | — | — | — | — | — | 93 | — | — | — | — | — | — | — | 91/100 | 6 | 117 | 150 |
| 30 | — | — | 180 | — | — | — | — | — | 15 | — | — | — | — | — | — | 13/100 | 21 | 128 | 125 |
| 31 | — | — | 102 | — | — | — | — | — | 58 | — | — | — | — | — | — | 27/100 | 16 | 125 | 170 |
| 32 | — | — | 75 | — | — | — | — | — | — | 97 | — | — | — | — | — | 75/100 | 13 | 114 | 200 |

TABLE 14-continued

| | Aqueous resin solution (part) | | | | Melt mixture powder (part) | | | | | | | | | | | Molar ratio of epoxy group and carboxyl group | Malamine resin (part) | TiO$_2$ (part) | Deionized water (part) |
|---|---|---|---|---|---|---|---|---|---|---|---|---|---|---|---|---|---|---|---|
| | 1 | 2 | 3 | 4 | 1 | 2 | 3 | 4 | 5 | 6 | 7 | 8 | 9 | 10 | 11 | | | | |
| 33 | — | — | 8 | — | — | — | — | — | — | 134 | — | — | — | — | — | 87/100 | 3 | 127 | 240 |
| 34 | — | — | — | 135 | — | — | — | — | — | — | 38 | — | — | — | — | 25/100 | 8 | 114 | 190 |
| 35 | — | — | — | 85 | — | — | — | — | — | — | 73 | — | — | — | — | 56/100 | 5 | 115 | 200 |
| 36 | — | — | — | 75 | — | — | — | — | — | — | — | 87 | — | — | — | 98/100 | 5 | 125 | 210 |
| Comparative | | | | | | | | | | | | | | | | | | | |
| 7 | 139 | — | — | — | — | — | — | — | — | — | — | — | 70 | — | — | — | 10 | 117 | 120 |
| 8 | 266 | — | — | — | 41 | — | — | — | — | — | — | — | — | — | — | 9/100 | 20 | 135 | 60 |
| 9 | — | — | 170 | — | — | — | — | — | — | — | — | — | 38 | — | — | 67/100 | 19 | 137 | 140 |
| 10 | — | — | — | 31 | — | — | — | — | — | — | — | 118 | — | — | — | 167/100 | 3 | 126 | 225 |
| 11 | — | 230 | — | — | — | — | — | — | — | — | — | — | — | — | 45 | 70/100 | 18 | 120 | 60 |

EXAMPLE 37

The coating composition obtained in Example 23 was applied onto the surface of a steel plate treated with zinc phosphate solution to make a dry film thickness of 30 microns, subjected to setting for 10 minutes and then heated at 160° C. for 30 minutes, whereby a crosslinked coating film was formed.

The coating film was subjected to test for water-resistance. Namely, it was dipped in hot water of 40° C. for 240 hours, and then the appearance was observed. No abnormality was produced. Also, the coating film was subjected to test for water-resistant adhesion. Namely, it was dipped in hot water of 40° C. for 240 hours, allowed to stand at 20° C. under a humidity of 75% for 24 hours and subjected to 1 mm cross-cut tape peeling off test. The remaining percentage of the coating film was determined to be 100%. Further, the coating composition used above was subjected to test for storage stability. Namely, it was allowed to stand at 40° C. for 96 hours. No variation in viscosity was produced.

EXAMPLE 38

In the same manner as in Example 37, the coating compositions obtained in Examples 24 to 36 and Comparative Examples 7 to 11 and the coating films formed thereby were tested, and the results are shown in Table 15.

The evaluations of the results were made on the following criteria:

TABLE 15

| | Water-resistance | Water-resistant adhesion | Storage stability |
|---|---|---|---|
| Example | | | |
| 24 | O | O | O |
| 25 | O | O | O |
| 26 | O | O | O |
| 27 | O | O | O |
| 28 | O | O | O |
| 29 | O | O | O |
| 30 | O | Δ | O |
| 31 | O | O | O |
| 32 | O | O | O |
| 33 | O | O | O |
| 34 | O | O | O |
| 35 | O | O | O |
| 36 | O | O | Δ |
| Comparative | | | |
| 7 | Δ | X | O |
| 8 | Δ | X | O |
| 9 | O | Δ | X |
| 10 | Δ | X | X |
| 11 | O | O | X |

Water-resistance:
O: no abnormality
Δ: gloss somewhat lost
X: gloss remarkably lost or blister produced
Water-resistant adhesion (adhesion after immersion in warm water):
O: coating film remaining percentage of more than 99%
Δ: coating film remaining percentage of more than 80%
X: coating film remaining percentage of 80% or less
Storage stability:
O: variation of viscosity not observed
Δ: variation of viscosity somewhat observed
X: remarkable variation of viscosity or gellation observed

Part D

EXAMPLE 39

(A) Preparation of the resin powder:

A polyester resin "Finedick M6107" (500 parts), an epoxy resin "Epicoat 1004" (500 parts) and titanium oxide of rutile type (100 parts) were melt mixed by the aid of a kneader. After cooling, the solidified mixture was crushed at room temperature to give the resin powder (1) having a maximum particle size of 45 microns.

(B) Preparation of the pigment paste:

The following materials were charged in a 1 liter volume stainless steel vessel and mixed well by the aid of a paint conditioner at room temperature for 30 minutes to give the coating paste (1) of gray color:

| | Part(s) |
|---|---|
| Aqueous resin solution No. 1*[(1)] | 300 |
| Resin powder (1) | 70 |
| Mica | 32 |
| Carbon black | 5 |
| Zinc chromate | 32 |
| Titanium oxide of rutile type | 70 |
| Deionized water | 90 |
| Total | 599 |

*[(1)]Aqueous maleinated polybutadiene resin obtained by modifying 1,4-polybutadiene ("Polyoil 110" manufactured by Huls) with maleic anhydride; acid value, 90; neutralization rate with dimethylethanolamine, 80%; solid content, 30%; molecular weight, 1300.

(C) Preparation of the coating composition:

Into a liter stainless steel made vessel, the paste (1) (400 parts) and hexamethoxymethylolmelamine (25 parts) were charged, and the resulting mixture was stirred by the aid of a mixer at room temperature for 15 minutes to give a coating composition (1) of gray color.

EXAMPLES 40 to 43 and Comparative Examples 12 to 14

In the same manner as in Example 39, there were prepared the pigment pastes and the coating compositions as shown in Table 16.

EXAMPLE 44

A dull steel plate (100×150×0.8 mm) was treated with a zinc phosphate solution and subjected to electro-deposition coating using a cation electro-deposition coating composition ("Powertop U-30" manufactured by Nippon Paint) at 150 V for 3 minutes, followed by baking at 170° C. for 30 minuters to make a coating film of 20 microns.

The coating composition obtained in each of the above Examples and Comparative Examples was diluted with a thinner to make a viscosity of 25 seconds/No. 4 Ford Cup (20° C.). The dilution was applied onto the said electro-deposition coating film by spraying to make a coating film having a dry thickness of 15 to 70 microns. Then, an aqueous intermediate coating composition ("Eaude-Super WS 100" manufactured by Nippon Paint) was applied onto the surface of the above coating film to make a coating film having a dry thickness of 15 to 25 microns, followed by drying at 150° C. for 30 minutes. Thereafter, a top coating composition ("Orga G 25 White" manufactured by Nippon Paint) was applied thereto to make a coating film of 35 to 45 microns in dry thickness, followed by drying at 140° C. for 30 minutes.

The thus coated steel plate was test on various performances, and the results are shown in Table 17.

The application property on the application was determined from the limit of the film thickness not producing any pinhole and the limit of the film thickness not producing sag on the following criteria:

| Mark | Limit of film thickness not producing pinhole | Limit of film thickness not producing sag |
|---|---|---|
| ⊙ | more than 50 microns | more than 55 microns |
| O | 40 to 50 microns | 40 to 55 microns |
|   | 35 to 40 microns | 30 to 40 microns |
| X | less than 35 microns | less than 30 microns |

The chipping resistance was evaluated from the degree of damage on the coating film when jetted with 300 grams of pebbles of 9 to 15 mm in diameter at 0° C. under a pressure of 2 kg/cm² by the use of a gravellometer (manufactured by Q Pannel). The degree of damage was calculated according to the following equation:

Degree of Damage = (a)/(b)×100 wherein (a) is the number of damages reached to the substrate and (b) is the number of all damages when the plate after tested by the use of the gravellometer was subjected to salt spray test for 240 hours.

The gloss was determined according the method as described in JIS K-5400.

The finishing appearance was evaluated on the following criteria:

| Mark | |
|---|---|
| ⊙ | Good smoothness, gloss of more than 93 |
| O | Good smoothness |
| X | Poor smoothness, gloss of less than 75 |

TABLE 16

|  | Example | | | | Comparative | | |
|---|---|---|---|---|---|---|---|
|  | 40 | 41 | 42 | 43 | 12 | 13 | 14 |
| Aqueous resin solution No. 1 | 187 | 300 | — | — | — | — | — |
| Aqueous resin solution No. 2*[1] | — | — | 300 | — | 300 | 300 | 510 |
| Aqueous resin solution No. 3*[2] | — | — | — | 300 | — | — | — |
| Resin powder (1) | 120 | 70 | 70 | 70 | 70 | 70 | — |
| Sericite | 32 | 60 | — | — | — | — | 32 |
| Talc | — | — | 32 | — | — | 32 | — |
| Carbon black | 5 | 3 | 5 | 5 | 5 | 5 | 5 |
| Barium sulfate | — | — | — | 32 | — | — | — |
| Zinc chromate | 32 | 32 | — | 32 | 32 | — | — |
| Strontium chromate | — | — | 32 | — | — | — | 32 |
| TiO₂ | 70 | 45 | 70 | 70 | 102 | 102 | 70 |
| Deionized water | 153 | 90 | 90 | 90 | 90 | 90 | 90 |
| Total amount | 599 | 599 | 599 | 599 | 599 | 599 | 599 |

Note:
*[1] Aqueous resin solution No. 2: alkyd resin, acid value 55, hydroxy value 40, neutralization rate 80%, solid content 30%, molecular weight 1360.
*[2] Aqueous resin solution No. 3: polyester resin, acid value 15, hydroxy value 100, neutralization rate 100%, solid content 30%, molecular weight 1480.

TABLE 17

|  | Film thickness (μ) | Workability on coating | Film property after top coat | | | Finishing appearance |
|---|---|---|---|---|---|---|
|  |  |  | Chipping resistance | | Gloss |  |
|  |  |  | Degree of damage | Percentage of damage |  |  |
| Example | | | | | | |
| 39 | 15–20 | ⊙ | 8M | 9 | 97 | ⊙ |
| 40 | 18–23 | ⊙ | 8F | 0 | 97 | ⊙ |
| 41 | 18–23 | ⊙ | 8M | 5 | 97 | ⊙ |
| 42 | 35–40 | ⊙ | 8M | 5 | 95 | ⊙ |
| 43 | 60–70 | ⊙ | 8M | 3 | 90 | O |
| Comparative | | | | | | |
| 12 | 18–23 | ⊙ | 8D | 60 | 80 | O |
| 13 | 18–23 | ⊙ | 8D | 50 | 90 | O |
| 14 | 18–23 | X | 6D | 80 | 60 | X |

Part E

EXAMPLE 45

(A) Preparation of the powder composition:

A polyester resin in a powdery form "Finedick M6103" (8 parts), an epoxy resin in a powdery form "Epicoat 1004" (8 parts) and precipitated barium sulfate pigment ("BF-10" manufactured by Sakai Chemical Ind. Co., Ltd.) (10 parts) were melt mixed at 110° C. by the aid of a kneader. After cooling, the solidified mixture was pulverized and sieved to make particles of not more than 105 microns.

(B) Preparation of the powder composition paste:

The powder composition obtained in (A) (52 parts), an aqueous polyester resin solution (acid value, 55; hydroxyl value, 35; molecular weight, 1,360; neutralizing agent, dimethylethanolamine; neutralization rate, 80%; non-volatile content, 50%; pH, 6.6) (42 parts) and deionized water (30 parts) were pre-mixed uniformly and dispersed at 70° C. by the aid of a disper for 15 minutes to give a powder composition paste (pH, 6.3; particle size, not more than 25 microns).

(C) Preparation of the pigment paste:

The aqueous polyster resin solution as used in (B) (42 parts), deionized water (30 parts) and titanium oxide pigment ("Titan R-820" manufactured by Ishihara Sangyo Kaisha, Ltd.) (53 parts) were pre-mixed uniformly and dispersed in the presence of glass beads by the aid of a paint conditioner for 30 minutes to give a pigment paste (pH, 7.3; viscosity, 86 Ku/25° C.; particle size, not more than 10 microns).

(D) Preparation of the coating composition:

The powder composition paste obtained in (B) (124 parts) and the pigment paste obtained in (C) (125 parts) were mixed uniformly, and melamine resin "Cymel 300" (20 parts) was added thereto to make a coating composition (weight ratio of resin powder and aqueous polyester resin, 43/57; weight ratio of basic pigment and polyester resin powder, 80/100).

(E) Coating test

The coating composition obtained in (D) was diluted with pure water to make a viscosity of 30 seconds/No. 4 Ford Cup at 20° C. This dilution was applied onto the surface of a steel plate by spraying immediately or after storage at 40° C. for a period of 5 to 15 days. After setting for 5 minutes, baking was effected at 150° C. for 30 minutes.

The limit of the film thickness producing no pinhole on the formed coating film was determined, and the results are shown in Table 18.

EXAMPLE 46

(A) Preparation of the powder composition:

Using a polyester resin in a powdery form "Finedick M6103" (8 parts), an epoxy resin in a powdery form "Epicoat 1004" (8 parts) and zinc oxide pigment ("Aenka No. 1" manufactured by Sakai Chemical) (0.5 parts), a powder composition was prepared in the same manner as in Example 45 (A).

(B) Preparation of the powder composition paste:

Using the powder composition obtained in (A) (35 parts), an aqueous polyester resin solution (acid value, 55; hydroxyl value, 35; molecular weight, 1,360; neutralizing agent, dimethylethanolamine; neutralization rate, 80%; non-volatile content, 50%; pH, 6.6) (42 parts) and deionized water (30 parts), a powder composition paste (pH, 6.3; particle size, not more than 25 microns) was prepared in the same manner as in Example 45 (B).

(C) Preparation of the pigment paste:

In the same manner as in Example 45 (C), a pigment paste was prepared.

(D) Preparation of the coating composition:

Using the powder composition paste obtained in (B) (107 parts) and the pigment paste obtained in (C) (125 parts) and melamine resin "Cymel 300" (20 parts), a coating composition (weight ratio of resin powder and aqueous polyester resin, 45/55; weight ratio of basic pigment and polyester resin powder, 6/100) was prepared in the same manner as in Example 45 (D).

(E) Coating test:

In the same manner as in Example 45 (E), the coating composition obtained in (D) was subjected to test for determination of the limit of the film thickness producing no pinhole. The results are shown in Table 18.

EXAMPLE 47

(A) Preparation of the powder composition:

Using a polyester resin in a powdery form "Finedick M6103" (8 parts) and an epoxy resin in a powdery form "Epicoat 1004" (8 parts), a powder composition was prepared in the same manner as in Example 45 (A).

(B) Preparation of the powder composition paste:

Using the powder composition obtained in (A) (26 parts), an aqueous polyester resin solution (acid value, 55; hydroxyl value, 35; molecular weight, 1,360; neutralizing agent, dimethylethanolamine; neutralization rate, 80%; non-volatile content, 50%; pH, 6.6) (42 parts) and deionized water (30 parts), a powder composition paste (pH, 6.3; particle size, not more than 25 microns) was prepared in the same manner as in Example 45 (B).

(C) Preparation of the pigment paste:

Using the aqueous polyester resin solution as used in (B) (42 parts), deionized water (30 parts), titanium oxide pigment "Titan R-820" (53 parts) and and precipitated barium sulfate pigment ("BF-10") (19 parts), a pigment paste (pH, 7.3; viscosity, 86 Ku/25° C.; particle size, not more than 10 microns) was prepared in the same manner as in Example 45 (C).

(D) Preparation of the coating composition:

Using the powder composition paste obtained in (B) (105 parts), the pigment paste obtained in (C) (144 parts) and melamine resin "Cymel 300" (20 parts), a coating composition (weight ratio of resin powder and aqueous polyester resin, 45/55; weight ratio of basic pigment and polyester resin powder, 109/100) was prepared in the same manner as in Example 45 (D).

(E) Coating test:

In the same manner as in Example 45 (E), the coating composition obtained in (D) was subjected to test for determination of the limit of the film thickness producing no pinhole. The results are shown in Table 18.

EXAMPLE 48

(A) Preparation of the powder composition:

In the same manner as in Example 47 (A), a powder composition was prepared.

(B) Preparation of the powder composition paste:

In the same manner as in Example 47 (B), a powder composition paste was prepared.

(C) Preparation of the pigment paste:

Using an aqueous polyester resin solution (acid value, 55; hydroxyl value, 35; molecular weight, 1,360; neutralizing agent, dimethylethanolamine; neutralization rate, 80%; non-volatile content, 50%; pH, 6.6) (42 parts), deionized water (30 parts), titanium oxide pigment "Titan R-820" (53 parts) and zinc oxide pigment "Aenka No. 1" (1.0 part), a pigment paste (pH, 7.3; viscosity, 86 Ku/25° C.; particle size, not more than 10 microns) was prepared in the same manner as in Example 45 (C).

(D) Preparation of the coating composition:

Using the powder composition paste obtained in (B) (105 parts), the pigment paste obtained in (C) (126 parts) and melamine resin "Cymel 300" (20 parts), a coating composition (weight ratio of resin powder and aqueous polyester resin, 45/55; weight ratio of basic pigment and polyester resin powder, 6/100) was prepared in the same manner as in Example 45 (D).

(E) Coating test:

In the same manner as in Example 45 (E), the coating composition obtained in (D) was subjected to test for determination of the limit of the film thickness producing no pinhole. The results are shown in Table 18.

EXAMPLE 49

(A) Preparation of the powder composition:

In the same manner as in Example 45 (A), a powder composition was prepared.

(B) Preparation of the powder composition paste:

In the same manner as in Example 45 (B) but the dispersing after the pre-mixing being carried out by the aid of a paint conditioner in a zirconium medium for 40 minutes, a powder composition paste (pH, 6.4; pigment paste, not more than 30 microns) was prepared.

(C) Preparation of the pigment paste:

In the same manner as in Example 45 (C), a pigment paste was prepared.

(D) Preparation of the coating composition:

Using the powder composition paste obtained in (B) (124 parts), the pigment paste obtained in (C) (125 parts) and melamine resin "Cymel 300" (20 parts), a coating composition (weight ratio of resin powder and aqueous polyester resin, 43/57; weight ratio of basic pigment and polyester resin powder, 80/100) was prepared in the same manner as in Example 45 (D).

(E) Coating test:

In the same manner as in Example 45 (E), the coating composition obtained in (D) was subjected to test for determination of the limit of the film thickness producing no pinhole. The results are shown in Table 18.

EXAMPLE 50

(A) Preparation of the powder composition:

In the same manner as in Example 45 (A), a powder composition was prepared.

(D) Preparation of the coating composition:

The powder composition obtained in (A) (52 parts), an aqueous polyester resin solution (acid value, 55; hydroxyl value, 35; molecular weight, 1,360; neutralizing agent, dimethylethanolamine; neutralization rate, 80%; non-volatile content, 50%; pH, 6.6) (84 parts), deionized water (60 parts) and titanium oxide pigment "Titan R-820" (53 parts) were pre-mixed uniformly. The resultant mixture was dispersed in the presence of a zirconium medium by the aid of a paint conditioner for 40 minutes. Then, melamine resin "Cymel 300" was incorporated therein to make a coating composition (weight ratio of resin powder and aqueous polyester resin, 43/57; weight ratio of basic pigment and polyester resin powder, 80/100).

(E) Coating test:

In the same manner as in Example 45 (E), the coating composition obtained in (D) was subjected to test for determination of the limit of the film thickness producing no pinhole. The results are shown in Table 18.

EXAMPLE 51

(A) Preparation of the powder composition:

In the same manner as in Example 45 (A) but the resulting composition being melt mixed at 110° C. by the aid of a co-kneader and, after cooling, pulverized to make an average particle size of not more than 30 microns, there was prepared a powder composition.

(B) Preparation of the powder composition paste:

An aqueous polyester resin solution (acid value, 55; hydroxyl value, 35; molecular weight, 1,360; neutralizing agent, dimethylethanolamine; neutralization rate, 80%; non-volatile content, 50%; pH, 6.6) (42 parts) was admixed with deionized water (30 parts). To the resultant mixture, the powder composition obtained in (A) (52 parts) was added thereto while stirring by the aid of a disper to make a powder composition paste (pH, 6.4; particle size, not more than 30 microns).

(C) Preparation of the pigment paste:

In the same manner as in Example 45 (C), a pigment paste was prepared.

(D) Preparation of the coating composition:

Using the powder composition paste obtained in (B) (124 parts), the pigment paste obtained in (C) (125 parts) and melamine resin "Cymel 300" (20 parts), a coating composition (weight ratio of resin powder and aqueous polyester resin, 43/57; weight ratio of basic pigment and polyester resin powder, 80/100) was prepared in the same manner as in Example 45 (D).

(E) Coating test:

In the same manner as in Example 45 (E), the coating composition obtained in (D) was subjected to test for determination of the limit of the film thickness producing no pinhole. The results are shown in Table 18.

TABLE 18

| | Limit of film thickness producing no pinhole ($\mu$) | | |
|---|---|---|---|
| | Immediately after preparation | Period for storage at 40° C. | |
| Example | | 10 days | 15 days |
| 45 | 60 | 53 | 50 |
| 46 | 57 | 50 | 48 |
| 47 | 60 | 46 | 41 |
| 48 | 56 | 47 | 40 |
| 49 | 58 | 52 | 49 |
| 50 | 50 | 43 | 40 |
| 51 | 58 | 52 | 49 |

Within the spirit and scope of the invention as explained above, various embodiments are possible.

One of such embodiments is a coating composition excellent in chipping resistance which comprises the resin powder (I), the basic compound (II), the aqueous resin (III), the antichipping pigment (VI) and the anticorrosive pigment (VII) in an aqueous medium, wherein the weight proportion of the resin powder (I) and the aqueous resin (III) being from 2:98 to 60:40, the weight proportion of the antichipping pigment (VI) and the combination of the resin powder (I) and the aqueous resin (III) being 2–50: 100 and the weight proportion of the anticorrosive pigment (VII) and the combination of the resin powder (I) and the aqueous resin (III) being 2–50:100. The basic substance (II) may be used in such an amount sufficient to neutralize the carboxy group(s)

in the resin powder (I) and optionally in the aqueous resin (III) so as to disperse the resin powder (I) and optionally the aqueous resin (III). The resin powder (I) is preferred to have a melting point of not less than 40° C. and an average molecular weight of not more than 500 microns. The aqueous resin (III) is preferred to have a water tolerance of not less than 4 and a surface tension of not more than 51 dyne/cm (determined on 1% by weight aqueous solution). Advantageously, the aqueous resin (III) has a total amount of hydrophilic functional groups (e.g. carboxy, sulfonate, phosphate, hydroxyl, active methylol, amino) of 0.3 to 5 mmol/g (particularly of 0.5 to 4 mmol/g) and an average molecular weight of 500 to 20,000 (particularly of 700 to 5,000). In case of the hydrophilic functional group being carboxy, its amount may be from 0.2 to 4 mmol/g (particularly from 0.3 to 3 mmol/g). In case of the hydrophilic functional group being hydroxyl, its amount may be from 0.2 to 3 mmol/g (particularly from 0.3 to 2 mmol/g). The antichipping pigment (VI) may be an inorganic pigment of foil or flake having an average particle size of not more than 20 microns, preferably of not more than 2 microns.

For preparation of such composition with the above components, any procedure as hereinbefore stated may be adopted. A particularly preferred procedure comprises dispersing a melt mixture powder comprising the resin powder (I) and an epoxy resin as the reactive compound (IV) into an aqueous medium comprising the aqueous resin (III), the antichipping pigment (VI) and the anticorrosive pigment (VII) in the presence of the basic compound (II).

The coating composition of the above embodiment is particularly useful for formation of an anticorrosive undercoat on the surface of a steel plate. Normally, an electrodeposition coating as a primer coat is formed thereon. Thus, the said undercoat is required to have not only a high corrosion resistance but also a good adhesion to the steel plate and the primer coat. The coating composition may be applied to a substrate in a conventional manner to make a coating film having a thickness of 10 to 200 microns, particularly of 20 to 150 microns. The resulting coating film has usually a glass transition point (Tg) of $-30°$ to $+10°$ C. and an adhesive strength of not less than 20 kg/cm$^2$ (onto the electrodeposited primer coating film).

Another embodiment is a coating composition having a highly enhanced stability. Such composition comprises the resin powder (I), the basic compound (II), the aqueous resin (III) and the basic pigment (V) optionally with the reactive compound (IV) in an aqueous medium, the weight proportion of the resin powder (I) and the aqueous resin (III) being from 2:98 to 98:2 and the weight proportion of the resin powder (I) and the basic pigment (V) being 100:3-300. The amount of the basic compound (II) may be sufficient to neutralize the carboxyl group(s) in the resin powder (I) and optionally in the aqueous resin (III) so as to disperse the resin powder (I) and optionally the aqueous resin (III) into the aqueous medium. Preparation of the coating composition is preferably effected by dispersing a melt mixture powder comprising the resin powder (I) and the basic pigment (V) and having a particle size of not more than 300 microns into an aqueous medium comprising the aqueous resin (III) and having a neutralization rate of 40 to 300%, especially of 60 to 100%, at a temperature of 35° to 95° C. to make a dispersion. The reactive compound (IV) such as an epoxy resin may be incorporated in any of the melt mixture powder, the aqueous medium or the dispersion. The said melt mixture powder is preferred to have a particle size of not more than 50 microns, particularly of not more than 25 microns. Further, the dispersion may be achieved at a temperature of not higher than 40° C. Application of such composition to a substrate may be achieved by a conventional procedure.

What is claimed is:

1. An aqueous coating composition which is a suspension which comprises in an aqueous medium: (I) a carboxy group-containing solid resin powder which is by itself hardly dispersible into the aqueous medium but becomes dispersible in the presence of a basic compound to give a particle size of 3 to 60 microns, (II) a basic compound, (III) an aqueous resin optionally containing a carboxy group which has an acid value of 20 to 200 and a number average molecular weight of 500 to 30,000 and (IV) an epoxy resin reactive with at least one of the resin powder (I) and the aqueous resin (III), solid particles of the resin powder (I) and the epoxy resin (IV) being dispersed in the composition and the aqueous resin (III) being dissolved or solubilized in the aqueous medium, the basic compound (II) being contained in an amount of 0.6 to 1.0 equivalent to the carboxy groups in the resin powder (I) or of 0.5 to 1.0 equivalent to the carboxy groups in the resin powder (I) and the aqueous resin (III) so as to disperse the resin powder (I) into the aqueous medium, the weight proportion of the resin powder (I) and the aqueous resin (III) being from 2:98 to 60:40, the weight proportion of the resin powder (I) and the epoxy resin (IV) being 10:1-20 and the molar proportion of the carboxy group and the epoxy group in the entire system being 100:10-150.

2. The coating composition according to claim 1, wherein the resin powder (I) and the epoxy resin (IV) are present in a melt mixture in a powdery form.

3. The coating composition according to claim 2 wherein the particle size of the melt mixture is from 0.5 to 100 microns.

4. The coating composition according to claim 1 which comprises additionally a melamine resin.

5. The coating composition according to claim 1 which further comprises a basic pigment (V).

6. The coating composition according to claim 5, wherein the resin powder (I) and the basic pigment (V) are present in a melt mixture in a powdery form.

7. The coating composition according to claim 5 wherein the resin powder (I), the epoxy resin (IV) and the basic pigment (V) are present in a melt mixture in a powdery form.

8. The coating composition according to claim 5 wherein the weight proportion of the resin powder (I) and the basic pigment (V) is 100:3-100.

9. The coating composition according to claim 1 which further comprises an antichipping pigment (VI) and an anticorrosive pigment (VII).

10. The coating composition according to claim 9 wherein the amounts of the antichipping pigment (VI) and of the anticorrosive pigment (VII) are respectively from 2 to 50 parts by weight to 100 parts by weight of the combined amount of the resin powder (I) and the aqueous resin (III).

11. A process for preparing the coating composition according to claim 1, which comprises admixing the resin powder (I) with the epoxy resin (IV) in a melt state, admixing the thus prepared melt mixture in a powder form with the basic compound (II) and the aqueous resin (III) in the aqueous medium and stirring the resultant mixture at a temperature of 35° to 95° C.

12. The process according to claim 11 wherein the neutralization rate of the resulting composition is from 30 to 120%.

13. The process according to claim 11 wherein the melt mixture of the resin powder (I) with the epoxy resin (IV) is first dispersed into the aqueous medium by the aid of at least a portion of the basic compound (II) and then the resultant dispersion is admixed with the aqueous resin (III) and optionally the remaining portion of the basic compound (II).

14. The process according to claim 11 wherein the aqueous resin (III) is first dissolved or dispersed in the aqueous medium in the presence of at least a portion of the basic compound (II) and then the resultant solution or dispersion is admixed with the melt mixture of the resin powder (I) with the epoxy resin (IV) and optionally the remaining portion of the basic compound (II).

* * * * *